(12) United States Patent
Wu

(10) Patent No.: US 11,375,390 B2
(45) Date of Patent: Jun. 28, 2022

(54) DEVICE AND METHOD OF HANDLING A MEASUREMENT CONFIGURATION AND A REPORTING

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/039,352

(22) Filed: Jul. 19, 2018

(65) Prior Publication Data

US 2019/0028914 A1    Jan. 24, 2019

Related U.S. Application Data

(60) Provisional application No. 62/535,254, filed on Jul. 21, 2017.

(51) Int. Cl.
*H04W 24/10* (2009.01)
*H04W 24/08* (2009.01)
(Continued)

(52) U.S. Cl.
CPC .......... *H04W 24/10* (2013.01); *H04L 5/0048* (2013.01); *H04W 24/08* (2013.01);
(Continued)

(58) Field of Classification Search
CPC . H04W 24/10; H04W 24/08; H04W 36/0085; H04W 36/0088; H04W 36/0094; H04W 36/08; H04W 76/27; H04L 5/0048
See application file for complete search history.

(56) References Cited

U.S. PATENT DOCUMENTS

2010/0271965 A1* 10/2010 Siomina ............... H04L 5/0007
370/252
2013/0003585 A1 1/2013 Siomina
(Continued)

FOREIGN PATENT DOCUMENTS

CN    103281721 A    9/2013
CN    103843392 A    6/2014
(Continued)

OTHER PUBLICATIONS

Intel Corporation, "SS block time index indication", 3GPP TSG RAN WG1 Meeting RAN1 #89, R1-1707338 Hangzhou, P.R. China May 15-19, 2017, pp. 1-4.
(Continued)

*Primary Examiner* — John D Blanton
(74) *Attorney, Agent, or Firm* — Winston Hsu

(57) ABSTRACT

A first base station (BS) for handling a measurement configuration and a reporting comprises at least one storage device and at least one processing circuit coupled to the at least one storage device. The at least one storage device stores, and the at least one processing circuit is configured to execute instructions of: transmitting a first measurement configuration to a first communication device, wherein the first measurement configuration configures a first allowed measurement bandwidth (MEAS_BW) and a location of the first allowed MEAS_BW on a first carrier; and receiving a first measurement report from the first communication device, wherein the first measurement report comprises at least one first measurement result which is measured by the first communication device according to at least one first reference signal (RS) within the first allowed MEAS_BW.

11 Claims, 4 Drawing Sheets

(51) Int. Cl.
*H04W 36/00* (2009.01)
*H04W 76/27* (2018.01)
*H04L 5/00* (2006.01)
*H04W 36/08* (2009.01)

(52) U.S. Cl.
CPC ... *H04W 36/0085* (2018.08); *H04W 36/0088* (2013.01); *H04W 36/0094* (2013.01); *H04W 36/08* (2013.01); *H04W 76/27* (2018.02)

(56) References Cited

U.S. PATENT DOCUMENTS

| | | | |
|---|---|---|---|
| 2015/0230041 A1 | 8/2015 | Fejzo | |
| 2015/0358094 A1* | 12/2015 | Yi | H04W 48/10 370/252 |
| 2016/0227428 A1 | 8/2016 | Novlan | |
| 2017/0150385 A1 | 5/2017 | Henttonen | |
| 2018/0049080 A1 | 2/2018 | Zhang | |
| 2018/0219664 A1* | 8/2018 | Guo | H04L 5/005 |
| 2018/0359073 A1* | 12/2018 | Frenne | H04L 5/0085 |
| 2018/0359149 A1* | 12/2018 | Shaheen | H04L 5/0092 |
| 2020/0067661 A1* | 2/2020 | Siomina | H04W 72/0453 |
| 2020/0153552 A1* | 5/2020 | Zhang | H04L 5/0092 |

FOREIGN PATENT DOCUMENTS

| | | |
|---|---|---|
| CN | 104798400 A | 7/2015 |
| CN | 104981994 A | 10/2015 |
| CN | 105580297 A | 5/2016 |
| CN | 105745964 A | 7/2016 |
| CN | 106233646 A | 12/2016 |
| WO | 2014/023878 A1 | 2/2014 |
| WO | 2014/098386 A1 | 6/2014 |
| WO | 2015/163633 A1 | 10/2015 |
| WO | 2015/164274 A1 | 10/2015 |
| WO | 2017/014229 A1 | 1/2017 |

OTHER PUBLICATIONS

Office action dated Apr. 25, 2019 for the Taiwan application No. 107125052, filing date Jul. 20, 2018, p. 1-13.

Search Report dated Sep. 19, 2018 for EP application No. 18184738. 5, pp. 1-8.

Catt, "Multiple SS block Transmission in wideband", 3GPP TSG RAN WG1 NR Ad-Hoc#2, R1-1710025, Jun. 27-30, 2017, Qingdao, P.R. China, XP051299250, pp. 1-5.

LG Electronics, "Remaining details on wider bandwidth operation", 3GPP TSG RAN WG1 Meeting Ad-Hoc, R1-1710352, Jun. 27-30, 2017, Qingdao, P.R. China, XP051299566, pp. 1-10.

MediaTek Inc., "Further Details on Wider Bandwidth Operations in NR", 3GPP TSG RAN WG1 NR Ad-Hoc#2, R1-17010796, Jun. 27-30, 2017, Qingdao, P.R. China, XP051300000, pp. 1-7.

Samsung, "RRM measurement configuration for BWP", 3GPP TSG RAN WG2 NR #101b Meeting, R2-1805849, Apr. 16-20, 2018, Sanya,China, XP051429465, pp. 1-5.

Nokia, Alcatel-Lucent Shanghai Bell, SS block time index indication, <3GPP TSG-RAN WG1 Meeting #89, R1-1708233>, Hangzhou, China, May 15-19, 2017.

Office action dated Apr. 23, 2021 for the China application No. 201810805726.0, filing date Jul. 20, 2018, p. 1-9.

Office action dated Dec. 9, 2021 for the China application No. 201810805726.0, filing date Jul. 20, 2018, p. 1-8.

* cited by examiner

DEVICE AND METHOD OF HANDLING A MEASUREMENT CONFIGURATION AND A REPORTING

CROSS REFERENCE TO RELATED APPLICATIONS

This application claims the benefits of U.S. Provisional Applications No. 62/535,254 filed on Jul. 21, 2017, which is incorporated herein by reference.

BACKGROUND OF THE INVENTION

1. Field of the Invention

The present invention relates to a device and a method used in a wireless communication system, and more particularly, to a device and a method of handling a measurement configuration and a reporting.

2. Description of the Prior Art

A new radio (NR) system, developed recently in 3rd generation partnership project (3GPP), is regarded as a NR interface and radio network architecture that provides a high data rate, low latency, packet optimization, and improved system capacity and coverage. In the NR system, a radio access network (RAN) includes a plurality of NR base stations (BSs) (i.e., gNBs) and communicates with a plurality of user equipments (UEs).

SUMMARY OF THE INVENTION

The present invention therefore provides a communication device and method for handling a measurement configuration and a reporting to solve the abovementioned problem.

A first base station (BS) for handling a measurement configuration and a reporting comprises at least one storage device and at least one processing circuit coupled to the at least one storage device. The at least one storage device stores, and the at least one processing circuit is configured to execute instructions of: transmitting a first measurement configuration to a first communication device, wherein the first measurement configuration configures a first allowed measurement bandwidth (MEAS_BW) and a location of the first allowed MEAS_BW on a first carrier; and receiving a first measurement report from the first communication device, wherein the first measurement report comprises at least one first measurement result which is measured by the first communication device according to at least one first reference signal (RS) within the first allowed MEAS_BW.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
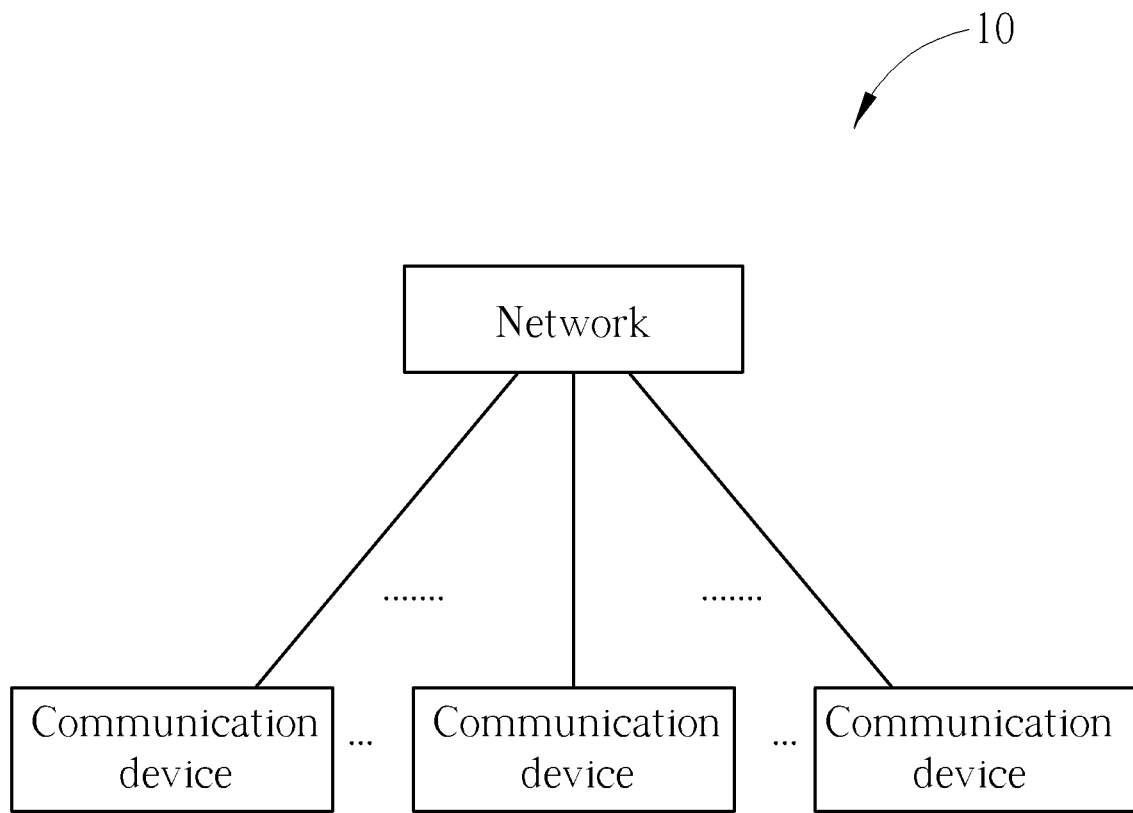
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs). The abovementioned cells may be operated in the same or different duplexing modes, i.e., frequency-division duplexing (FDD), time-division duplexing (TDD) or flexible duplexing.

In FIG. 1, the network and the communication devices are simply utilized for illustrating the structure of the wireless communication system 10. The network may include a radio access network (RAN) and a core network. The RAN may include at least one base station. The RAN may be an Evolved Universal Terrestrial Radio Access Network (E-UTRAN), a new radio (NR) RAN (or called a fifth generation (5G) RAN) or a sixth generation (6G) network. The core network may be an Evolved Packet Core (EPC) network or a 5G core network (5GCN).

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
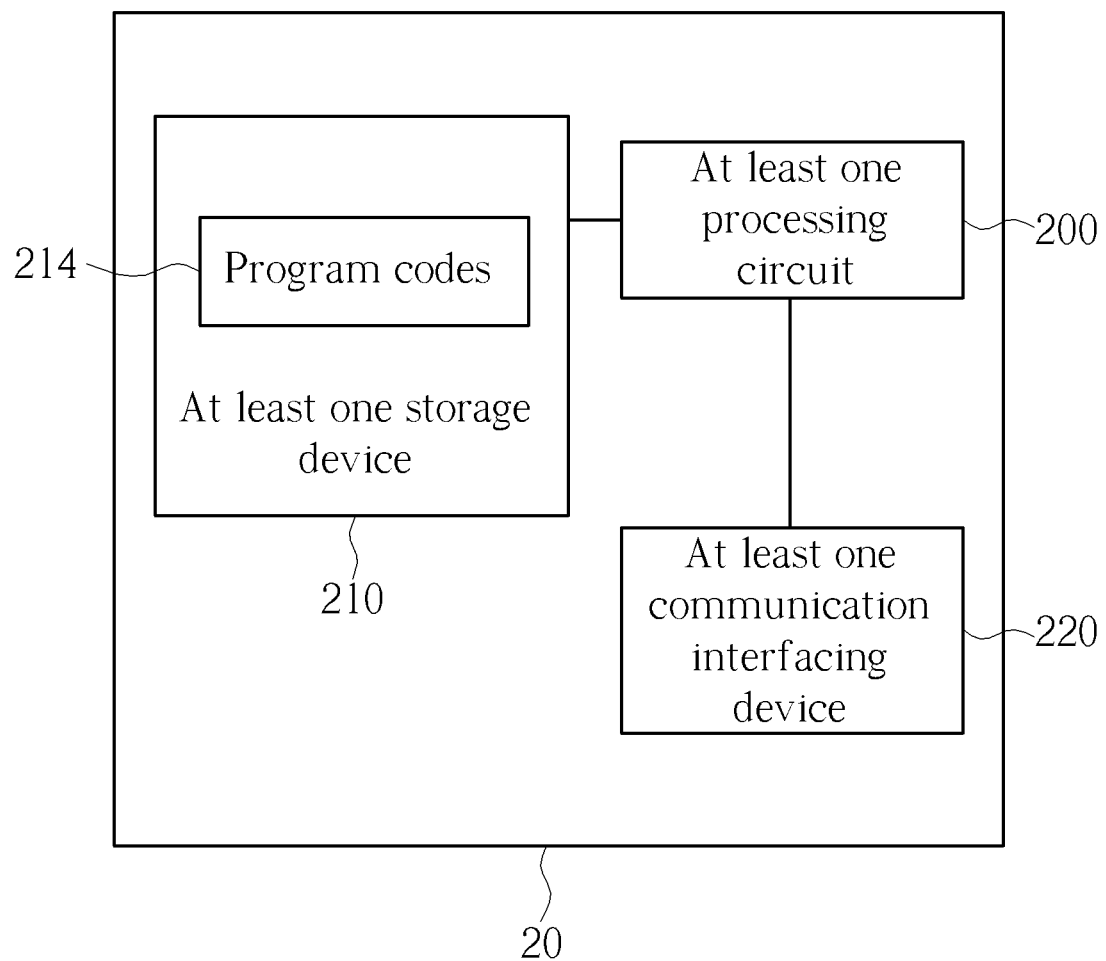
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used to represent a communication device in FIG. 1, to simplify the illustration of the examples.

Figure 3:
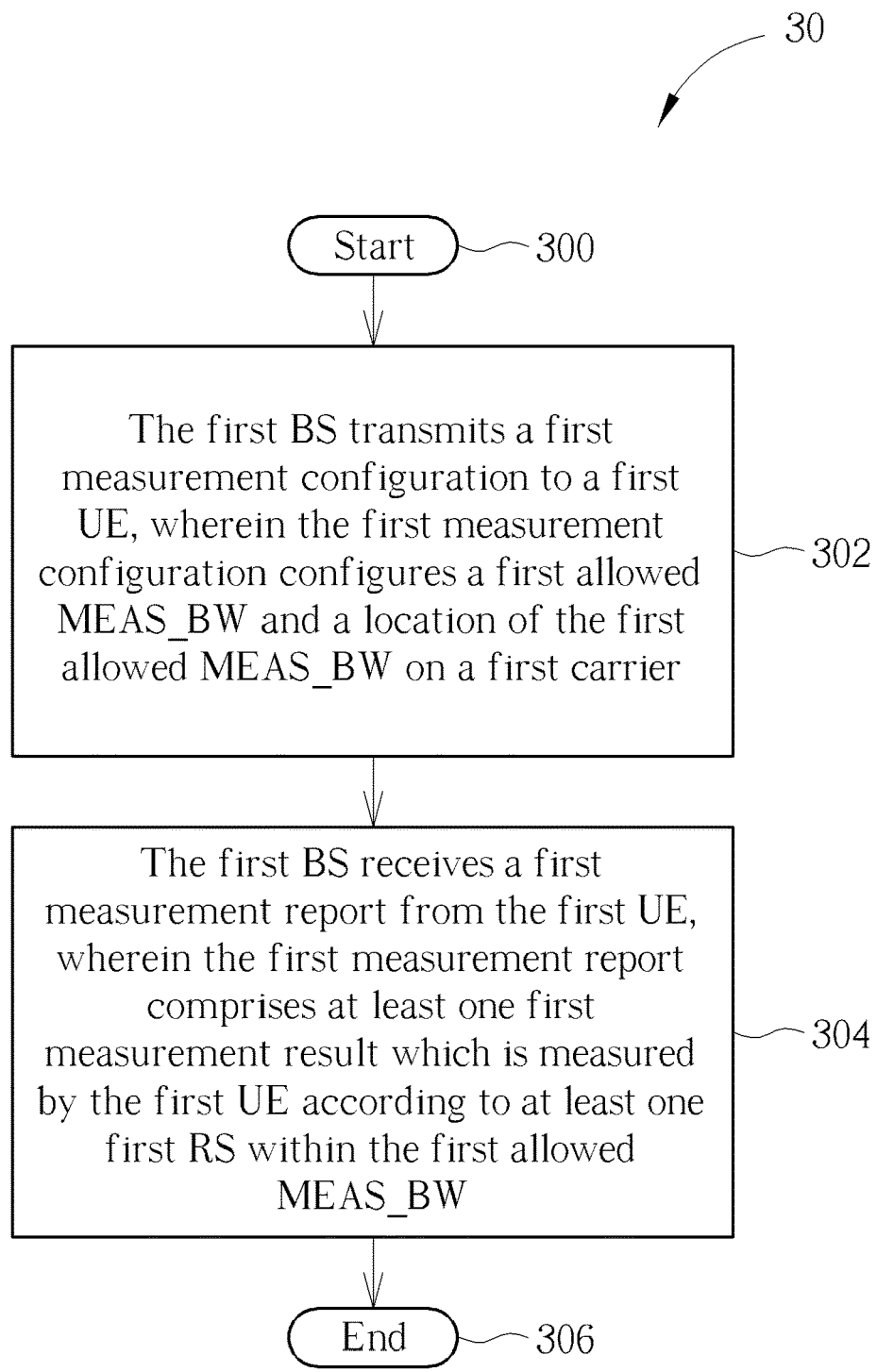
FIG. 3 is a flowchart of a process according to an example of the present invention.

A process 30 in FIG. 3 is utilized in a first BS of a network shown in FIG. 1, and includes the following steps:

Step 300: Start.

Step 302: The first BS transmits a first measurement configuration to a first UE, wherein the first measurement configuration configures a first allowed measurement bandwidth (MEAS_BW) and a location of the first allowed MEAS_BW on a first carrier.

Step 304: The first BS receives a first measurement report from the first UE, wherein the first measurement report comprises at least one first measurement result which is measured by the first UE according to at least one first reference signal (RS) within the first allowed MEAS_BW.

Step 306: End.

According to the process 30, the first measurement configuration includes information of a measurement (e.g., information of the first allowed MEAS_BW and the first carrier). The first BS informs the first UE in which bandwidth the measurement can be performed by transmitting the first measurement configuration.

In one example, the first measurement configuration configures a first absolute radio-frequency channel number (ARFCN) identifying the first carrier.

In one example, the first BS transmits a second measurement configuration to a second UE, wherein the second measurement configuration configures a second allowed MEAS_BW and a location of the second allowed MEAS_BW on a second carrier. Then, the first BS receives a second measurement report from the second UE, wherein the second measurement report includes at least one second measurement result which is measured by the second UE according to at least one second RS within the second allowed MEAS_BW. In one example, the second measurement configuration configures a second ARFCN identifying the second carrier.

In one example, the first measurement configuration includes first location information which configures the location (position) of the first allowed MEAS_BW. In one example, the first location information indicates a first reference position for indicating (or locating) the location of the first allowed MEAS_BW (e.g., a starting position, a center position or an end position of the first allowed MEAS_BW). Thus, the first UE determines the location of the first allowed MEAS_BW according to the first reference position and the first allowed MEAS_BW. For example, the first carrier includes a plurality of physical resource blocks (PRBs) (e.g., N PRBs numbered from 1 (with the lowest frequency) to N (with the highest frequency), and N=200). The first allowed MEAS_BW is represented in a first number of PRBs (e.g., L PRBs, L<N, and L=25). The first reference position may be a PRB number (e.g., a PRB index) indicating a specific PRB (e.g., the x-th PRB, 0<x<N, and x=1, i.e., the 1st PRB in the 200 PRBs) on the first carrier. Then, the first UE determines the location of the first allowed MEAS_BW according to the PRB number and the first number of PRBs. For example, the first allowed MEAS_BW is from the 1st PRB to the 25th PRB.

In one example, the second measurement configuration includes second location information which configures the location (position) of the second allowed MEAS_BW. In one example, the second location information indicates a second reference position for the location of the second allowed MEAS_BW (e.g., a starting position, a center position or an end position of the second allowed MEAS_BW). Thus, the second UE determines the location of the second allowed MEAS_BW on the second carrier according to the second reference position and the second allowed MEAS_BW. For example, the second carrier includes a plurality of PRBs (e.g., N PRBs numbered from 1 (with the lowest frequency) to N (with the highest frequency), and N=200). The second allowed MEAS_BW is represented in a second number of PRBs (e.g., M PRBs, M<N, and M=50 PRBs). The second reference position may be a PRB number indicating a specific PRB (e.g., the y-th PRB, 0<y<N, and y=51, i.e., the 51st PRB in the 200 PRBs) on the second carrier. Then, the second UE determines the location of the second allowed MEAS_BW according to the PRB number and the second number of PRBs. For example, the second allowed MEAS_BW is from the 51st PRB to the 100th PRB.

In one example, the first (or second) allowed MEAS_BW and the first (or second) location information indicating the location (position) of the first (or second) allowed MEAS_BW is replaced by a starting position and an end position on the first (or second) carrier. That is, the starting position and the end position indicate the first (or second) allowed MEAS_BW and the location of the first (or second) allowed MEAS_BW. The starting position may be a first PRB number, and the end position may be a second PRB number. The first PRB number indicates the first PRB of the first (or second) allowed MEAS_BW, and the second PRB number indicates the last PRB of the first (or second) allowed MEAS_BW. For example, the first PRB number is 51, and the second PRB number is 100. Then, the location of the first (or second) allowed MEAS_BW is from the 51st PRB to the 100th PRB (i.e., [51, 100]). For example, the first PRB number is 50, and the second PRB number is 101. Then, the location of the first (or second) allowed MEAS_BW is from the 51st PRB to the 100th PRB (i.e., (50, 101)).

In one example, the at least one first RS includes at least one of a primary synchronization signal (PSS), a secondary synchronization signal (SSS), a physical broadcast channel (PBCH) and a channel state information RS (CSI-RS). In one example, the at least one second RS includes at least one of a PSS, a SSS, a PBCH and a CSI-RS. In one example, the at least one first RS and the at least one second RS are the same or different. In one example, each of the at least one first (or second) measurement result is expressed in a unit of reference signal received power (RSRP) or reference signal received quality (RSRQ). The RSRP and/or RSRQ are calculated according to a plurality of measurements on at least one RS. The synchronization signal block (SSB) includes the PSS, the SSS and/or the PBCH.

In one example, a first measurement result in the at least one first measurement result is associated to a first cell. The first measurement report includes a first cell identity (cellId) of the first cell, which is associated to the first measurement result. In one example, a second measurement result in the at least one second measurement result is associated to the second cell. The second measurement report includes a second cellId of the second cell, which is associated to the second measurement result. In one example, the first cellId and the second cellId are the same or different. In one example, the first cellId is a physical cellId or a cell global identity. In one example, the second cellId is a physical cellId or a cell global identity.

In one example, the at least one first measurement result includes at least one first SSB index. The at least one first SSB index may indicate SSB(s) measured by the first UE. In one example, the first measurement report includes the at least one first SSB index associated to the at least one first measurement result. In one example, the at least one second measurement result includes at least one second SS block index. The at least one second SSB index may indicate SSB(s) measured by the second UE. In one example, the second measurement report includes the at least one second SSB index associated to the at least one second measurement result. In one example, the at least one first SS block index and the at least one second SS block index are the same or different.

In one example, a third measurement result in the at least one first measurement result is associated to a first CSI-RS configuration configuring at least one CSI-RS. In one example, the first measurement report includes a first CSI-RS identity of the first CSI-RS configuration, which is associated to the third measurement result. In one example, the third measurement result includes the first CSI-RS identity. In one example, a fourth measurement result in the at least one second measurement result is associated to a second CSI-RS configuration configuring at least one CSI-RS. In one example, the second measurement report includes a second CSI-RS identity of the second CSI-RS configuration, which is associated to the fourth measurement result. In one example, the fourth measurement result includes the second CS-RS identity. In one example, the first CSI-RS configuration and the second CSI-RS configuration are the same or different. In one example, the first CSI-RS identity and the second CSI-RS identity are the same or different.

In one example, the first UE connects to the first BS, and has a first signaling radio bearer (SRB) with the first BS. The first BS transmits the first measurement configuration on the first SRB to the first UE, and receives the first measurement report on the first SRB from the first UE. In one example, the second UE connects to the first BS, and has a second SRB with the first BS. The first BS transmits the second measurement configuration on the second SRB to the second UE, and receives the second measurement report on the second SRB from the second UE.

In one example, the first BS receives a first plurality of UE device capabilities (e.g., UE-NR-Capability or UE-EUTRA-Capability) of the first UE from the first UE, a third BS or a core network (e.g., Access and Mobility Management function (AMF) or Mobility Management Entity (MME)). In one example, the first plurality of UE capabilities indicate (e.g., include) a first maximum transmission (TX) bandwidth (BW) (TX_BW) or a first maximum reception (RX) bandwidth (RX_BW) for a first frequency band to which the first carrier belongs. In one example, the first maximum TX_BW is equal to or smaller than the first maximum RX_BW. The first BS may determine the first allowed MEAS_BW according to the first maximum RX_BW. That is, the first allowed MEAS_BW is smaller than the first maximum RX_BW.

In one example, the first BS receives a second plurality of UE device capabilities (e.g., UE-NR-Capability or UE-EUTRA-Capability) of the second UE from the second UE, the third BS or the core network. In one example, the second plurality of UE capabilities indicate (e.g., include) a second maximum TX_BW or a second maximum RX_BW for a second frequency band to which the second carrier belongs. In one example, the second maximum TX_BW is equal to or smaller than the second maximum RX_BW. The first BS may determine the second allowed MEAS_BW according to the second maximum RX_BW. That is, the second allowed MEAS_BW is equal to or smaller than the second maximum RX_BW.

In one example, the first maximum TX_BW; and the second maximum TX_BW are the same or different. In one example, the first maximum RX_BW and the second maximum. RX_BW are the same or different. In one example, the first maximum RX_BW and the second maximum RX_BW are smaller than a bandwidth of the first carrier and a bandwidth of the second carrier, respectively.

In one example, the first frequency band and the second frequency band are the same or different. In one example, the first carrier and the second carrier are the same or different. In one example, the location of the first allowed MEAS_BW and the location of the second allowed MEAS_BW on the first carrier is the same or different. In one example, the location of the first allowed MEAS_BW and the location of the second allowed MEAS_BW on the first carrier are (partially or completely) overlapped or non-overlapped. In one example, the first allowed MEAS_BW and the second allowed MEAS_BW are the same or different.

In one example, the first (or second) plurality of UE capabilities further include (e.g., indicate) at least one of the first (or second) frequency band, a third frequency band, a subcarrier spacing capability, a beam forming capability and a multiple-input multiple-output (MIMO) capability.

In one example, the first BS determines the location of the first allowed MEAS_BW according to the first plurality of UE capabilities. In one example, the first BS determines the location of the second allowed MEAS_BW according to the second plurality of UE capabilities. In one example, the first BS determines the location of the first (or second) allowed MEAS_BW according to a scheduling algorithm or a traffic offloading or dispersion algorithm in addition to the first (or second) plurality of UE capacities.

In one example, the first BS transmits a Handover Request message for the first UE to a second BS for preparing a handover to the first cell or to the second BS, in response to the first measurement report, when the first cell belongs to the second BS. The Handover Request message may include the first cellId or may include a third cellId which the first BS derives from the first cellId. The Handover Request message may include the first plurality of UE capabilities, the first allowed MEAS_BW and the location of the first allowed MEAS_BW. The Handover Request message may include the at least one first measurement result. Then, the second BS generates a handover command for the first UE. The handover command may include the first cellId, a maximum RX_BW and a location of the maximum RX_BW. The second BS transmits a Handover Request Acknowledge message including the handover command, to the first BS in response to the Handover Request message. Then, the first BS transmits the handover command to the first UE.

In one example, the second BS determines the maximum RX_BW according to the first maximum RX_BW or the first allowed MEAS_BW. If the handover command does not include the maximum RX_BW, the first UE performs at least one reception with the second BS in a default maximum. RX_BW. If the handover command does not include the location of the maximum RX_BW, the first UE performs at least one transmission with the second BS at a default location for the maximum RX_BW.

In one example, the handover command does or does not include a maximum TX_BW. For example, if the handover command includes a maximum TX_BW, the second BS determines the maximum TX_BW and a location of the maximum TX_BW according to the handover command. For example, if the handover command does not include a maximum TX_BW, the first UE communicates with the second BS in a default TX_BW. In one example, the handover command does or does not include a location of the maximum TX_BW. For example, if the handover command does not include the location of the maximum TX_BW, the first UE communicates with the second BS at a default location for the maximum TX_BW.

In one example, the first BS generates the handover command, when the first cell belongs to the first BS. In this case, the first BS does not transmit the Handover Request message and does not receive the Handover Request Acknowledge message. The first BS transmits the handover command to the first UE.

In one example, when the first UE receives the handover command, the first UE performs at least one reception with the second BS at the location of the maximum RX_BW and within the maximum RX_BW. The first UE transmits a handover complete to the second BS in response to the handover command. The first UE may transmit the handover complete at the location of the maximum. TX_BW and within the maximum TX_BW.

In one example, the handover command is a first RRC message (e.g., RRC Reconfiguration), and the handover complete is a first RRC response message (e.g., RRC Reconfiguration Complete message).

In one example, the first measurement configuration and the first measurement report include a first measurement identity, and the second measurement configuration and the second measurement report includes a second measurement identity.

In one example, the first BS transmits a second RRC message (e.g., a RRC Reconfiguration message) on the first SRB to the first UE in response to the at least one first measurement result. The second RRC message configures the first UE to connect to a fourth BS as a secondary node (SN) and configures a Secondary Cell Group (SCG) SRB for exchanging a plurality of RRC messages between the first UE and the fourth BS. In response to the second RRC message, the first UE connects to the fourth BS and is in dual connectivity (DC) with the first BS (e.g., master node (MN)) and the fourth BS.

In one example, the fourth BS transmits a third measurement configuration in a third RRC message (e.g., a RRC Reconfiguration message) to the first UE on a SCG SRB. The first UE transmits a third RRC response message (e.g., a RRC Reconfiguration Complete message) on the SCG SRB to the second BS in response to the third RRC message. The third measurement configuration configures a third ARFCN, a third allowed MEAS_BW and a location of the third allowed MEAS_BW. The fourth BS receives a third measurement report on the SCG SRB from the first UE, wherein the third measurement report includes at least one third measurement result which is measured by the first UE according to at least one third RS within the third allowed MEAS_BW.

In one example, the third allowed MEAS_BW is the same as or different from the first allowed MEAS_BW. In one example, the location of the third allowed MEAS_BW is the same as or different from the location of the first RX_BW or the location of the first allowed MEAS_BW. In one example, the location of the third allowed MEAS_BW and the location of the first RX_BW are overlapped or non-overlapped. In one example, the at least one third RS is the same as or different from the at least one first RS. In one example, the third ARFCN is different from the first ARFCN.

In one example, the first BS transmits a first measurement gap configuration to the first UE. The first UE may measure the at least one first RS at the location of the first allowed MEAS_BW in at least one gap configured in the first measurement gap configuration, to get the at least one first measurement result, and may not measure the at least one first RS at the location of the first allowed MEAS_BW without any gap. The first UE may measure the at least one first RS at the location of the first allowed MEAS_BW without any gap, when the first UE connects to the second BS.

In one example, the fourth BS transmits a second measurement gap configuration to the first UE. The first UE may measure the at least one third RS at the location of the third allowed MEAS_BW in at least one gap configured in the second measurement gap configuration, to get the at least one third measurement result, and may not measure the at least one third RS at the location of the third allowed MEAS_BW without any gap.

Figure 4:
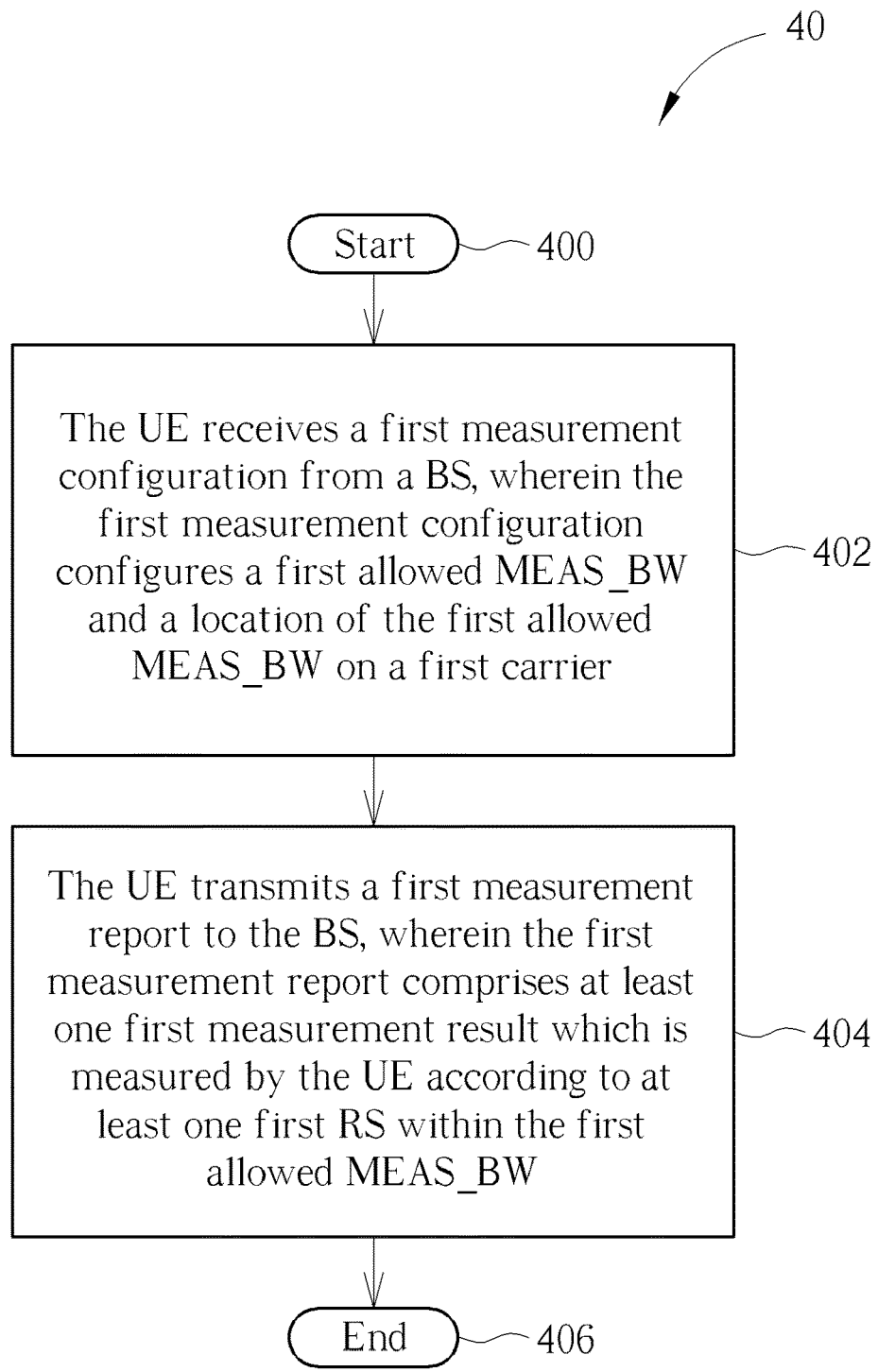
FIG. 4 is a flowchart of a process according to an example of the present invention.

A process 40 in FIG. 4 is utilized in a UE (e.g., the first UE in the process 30), and includes the following steps:

Step 400: Start.

Step 402: The UE receives a first measurement configuration from a BS, wherein the first measurement configuration configures a first allowed MEAS_BW and a location of the first allowed MEAS_BW on a first carrier.

Step 404: The UE transmits a first measurement report to the BS, wherein the first measurement report comprises at least one first measurement result which is measured by the UE according to at least one first RS within the first allowed MEAS_BW.

Step 406: End.

According to the process 40, the first measurement configuration includes information of a measurement (e.g., information of the first allowed MEAS_BW and the first carrier). The first UE knows in which bandwidth the measurement can be performed according to the first measurement configuration received from the BS (e.g., the first BS in the process 30).

In one example, the first measurement configuration configures a first ARFCN identifying the first carrier.

In one example, the UE receives a second measurement configuration (e.g., the third measurement configuration in the process 30) from the BS, wherein the second measurement configuration configures a second allowed MEAS_BW and a location of the second allowed MEAS_BW on the first carrier. The second measurement configuration may configure the first ARFCN. In one example, the UE transmits a second measurement report (e.g., the third measurement report in the process 30) to the BS, wherein the second measurement report includes at least one second measurement result which is measured by the UE according to at least one second RS within the second allowed MEAS_BW.

In one example, the second measurement configuration includes location information which configures a location (position) of the second allowed MEAS_BW. In one example, the location information indicates a reference position for the location of the second allowed MEAS_BW (e.g., a starting position, a center position or an end position of the second allowed MEAS_BW). Thus, the UE determines the location of the second allowed MEAS_BW on the first carrier according to the reference position and the second allowed MEAS_BW.

In the description above, "determine" may be replaced by "obtain", "compute" or "calculate".

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a measurement configuration and a reporting. A BS transmits the measurement configuration including location information of a MEAS_BW to a UE, to inform the UE a location of the MEAS_BW the measurement can be performed. Then, the UE transmits a measurement report to the BS in response to the measurement configuration. Thus, the problem of handling the measurement configuration and the reporting is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling a measurement configuration and a reporting, comprising:
   at least one storage device; and
   at least one processing circuit, coupled to the at least one storage device, wherein the at least one storage device stores, and the at least one processing circuit is configured to execute instructions of:
   transmitting a first measurement configuration to a first user equipment (UE), wherein the first measurement configuration includes a first number of physical resource blocks, and includes a first physical resource block number configuring a location of the first number of physical resource blocks on a first carrier and includes a first absolute radio-frequency channel number (ARFCN) identifying the first carrier;
   receiving a first measurement report from the first UE, wherein the first measurement report comprises at least one first measurement result which is measured by the first UE according to at least one first reference signal (RS) within the first number of physical resource blocks; and
   transmitting a second measurement configuration to a second UE, wherein the second measurement configuration includes a second number of physical resource blocks, includes a second physical resource block number configuring a location of the second number of physical resource blocks on a second carrier and includes a second ARFCN identifying the second carrier.

2. The first BS of claim 1, wherein the instructions further comprise:
   receiving a second measurement report from the second UE, wherein the second measurement report comprises at least one second measurement result which is measured by the second communication device according to at least one second RS within the second number of physical resource blocks.

3. The first BS of claim 1, wherein the at least one first measurement result comprises at least one synchronization signal block (SSB) index, wherein the at least one SSB index indicates at least one SSB measured by the first UE.

4. The first BS of claim 1, wherein the instructions further comprise:

transmitting a third measurement configuration to the first UE, wherein the third measurement configuration includes a third number of physical resource blocks, and includes a third physical resource block number configuring a location of the third number of physical resource blocks on the first carrier.

5. The first BS of claim 4, wherein the instructions further comprise:
   receiving a third measurement report from the first communication device, wherein the third measurement report comprises at least one third measurement result which is measured by the first UE according to at least one third RS within the third number of physical resource blocks.

6. A communication device for handling a measurement configuration and a reporting, comprising:
   at least one storage device; and
   at least one processing circuit, coupled to the at least one storage device, wherein the at least one storage device stores, and the at least one processing circuit is configured to execute instructions of:
   receiving a first measurement configuration from a base station (BS), wherein the first measurement configuration includes a first number of physical resource blocks, and includes a first physical resource block number configuring a location of the first number of physical resource blocks on a first carrier and includes a first absolute radio-frequency channel number (ARFCN) identifying the first carrier;
   determining the location of the first number of physical resource blocks according to the first physical resource block number;
   transmitting a first measurement report to the BS, wherein the first measurement report comprises at least one first measurement result which is measured by the communication device according to at least one first reference signal (RS) within the first number of physical resource blocks; and
   receiving a second measurement configuration from the BS, wherein the second measurement configuration includes a second number of physical resource blocks and includes a second physical resource block number configuring a location of the second number of physical resource blocks on the first carrier.

7. The communication device of claim 6, wherein the instructions further comprise:
   transmitting a second measurement report to the BS, wherein the second measurement report comprises at least one second measurement result which is measured by the communication device according to at least one second RS within the second number of physical resource blocks.

8. The communication device of claim 6, wherein the at least one first measurement result comprises at least one synchronization signal block (SSB) index, wherein the at least one SSB index indicates at least one SSB measured by the first communication device.

9. A method of handling a measurement configuration and a reporting for a communication device, the method comprising:
   receiving a first measurement configuration from a base station (BS), wherein the first measurement configuration includes a first number of physical resource blocks, and includes a first physical resource block number configuring a location of the first number of physical resource blocks on a first carrier and includes a first absolute radio-frequency channel number (ARFCN) identifying the first carrier; and determining the location of the first number of physical resource blocks according to the first physical resource block number;

transmitting a first measurement report to the BS, wherein the first measurement report comprises at least one first measurement result which is measured by the communication device according to at least one first reference signal (RS) within the first number of physical resource blocks; and receiving a second measurement configuration from the BS, wherein the second measurement configuration includes a second number of physical resource blocks and includes a second physical resource block number configuring a location of the second number of physical resource blocks on the first carrier.

10. The method of claim 9 further comprising:

transmitting a second measurement report to the BS, wherein the second measurement report comprises at least one second measurement result which is measured by the communication device according to at least one second RS within the second number of physical resource blocks.

11. The method of claim 9, wherein the at least one first measurement result comprises at least one synchronization signal block (SSB) index, wherein the at least one SSB index indicates at least one SSB measured by the first communication device.

* * * * *